(No Model.)
W. L. HALL.
EDUCATIONAL OR ADVERTISING FAN.
No. 598,509. Patented Feb. 8, 1898.
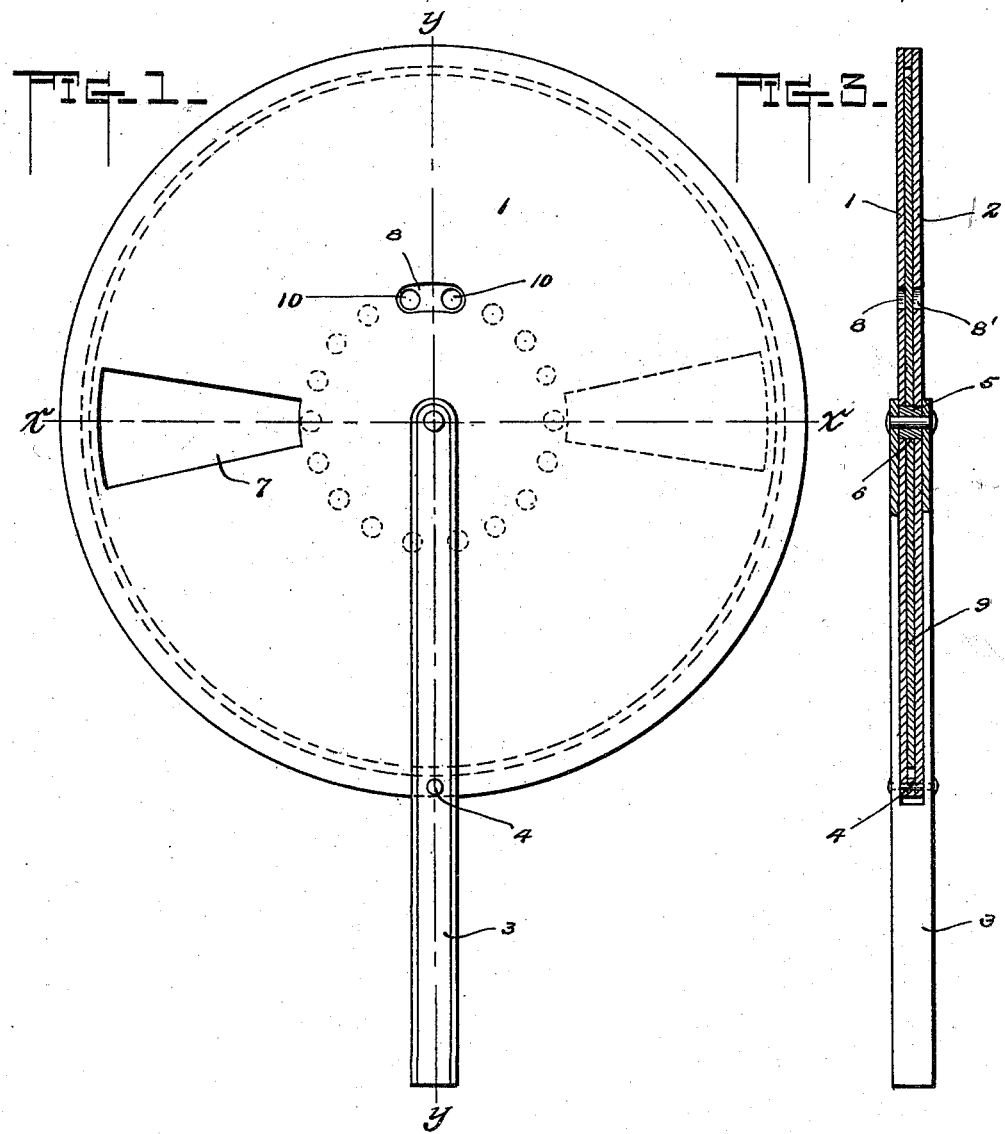
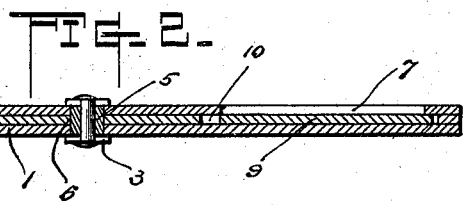
Witnesses
Willard L. Hall, Inventor
Attorney

UNITED STATES PATENT OFFICE.

WILLARD L. HALL, OF SPOKANE, WASHINGTON.

EDUCATIONAL OR ADVERTISING FAN.

SPECIFICATION forming part of Letters Patent No. 598,509, dated February 8, 1898.

Application filed June 21, 1897. Serial No. 641,760. (No model.)

*To all whom it may concern:*

Be it known that I, WILLARD L. HALL, a citizen of the United States, residing at Spokane, in the county of Spokane and State of Washington, have invented certain new and useful Improvements in Educational or Advertising Fans; and I do declare the following to be a full, clear, and exact description of the invention, such as will enable others skilled in the art to which it appertains to make and use the same.

My invention has relation to an educational or advertising fan; and the object of the invention is to provide a fan of this character which shall be simple in construction, durable in use, and comparatively cheap of production.

With this object in view the invention consists of certain features of construction and combination of parts, as will be hereinafter fully described and claimed.

In the accompanying drawings, Figure 1 is a front view of my improved fan. Fig. 2 is a cross-sectional view on the line $x\,x$, Fig. 1; and Fig. 3 is a similar view on the line $y\,y$, Fig. 1.

In said drawings, 1 and 2 denote the front and back pieces of a fan, the edges of which are secured together by any suitable means, but preferably by gluing.

3 denotes the handle, the bifurcated ends of which embrace the front and back pieces of the fan.

4 denotes a rivet for connecting the lower edges of the back and front pieces to the handle.

5 is a pivot or hub which projects through a central opening 6 in the center of the fan. At one side of the front piece of the fan is made a vision-opening 7 above the handle and other openings 8 8' in the front and back pieces of the fan for a purpose hereinafter to appear. 9 denotes a disk which is journaled upon said hub between the front and back pieces 1 and 2 and has annularly arranged upon its face a series of advertisements or instructive readings, or both, which are adapted to be presented to view through the vision-opening in the front piece of the fan. This disk has also an annular row of holes 10, whereby a person by inserting a pencil or a stick through one of these holes and the holes 8 and 8' may rotate the disk to successively bring to view through the vision-opening different advertisements or reading matter. If desired, more than one vision-opening may be employed.

From the foregoing description the construction and operation of the invention will be readily understood without requiring further explanation. When used as a toy, it will be both amusing and instructive to the infant mind—for instance, in reading the Lord's Prayer, the Ten Commandments, the Golden Rule, &c., which may be printed and made to appear through the vision-opening.

The fans may be utilized for all kinds of advertisements, including opera-house plays, Sunday-school plays, &c., and they may be made of any desired size as the occasion may require, and at the same time will be found to fill the requirements of a strong and durable fan.

Having thus fully described my invention, what I claim as new and useful, and desire to secure by Letters Patent of the United States, is—

An advertising or educational fan, comprising the front and back pieces secured together at their edges, and provided with a handle, the front and back pieces being provided with registering perforations or apertures, and the front piece being provided with a vision-opening, and a rotatable disk secured between the front and back pieces and having suitable instructions or advertisements adapted to be displayed through the vision-opening and also provided with an annular row of perforations adapted to register with the coincident openings in the back and front pieces of the fan, substantially as set forth.

In testimony whereof I hereunto affix my signature in presence of two witnesses.

WILLARD L. HALL.

Witnesses:
A. R. SHAFFER,
D. R. MCDONALD.